(12) United States Patent
Luo et al.

(10) Patent No.: US 8,571,594 B2
(45) Date of Patent: Oct. 29, 2013

(54) SYSTEM AND METHOD FOR OVERLOAD INDICATION

(75) Inventors: Tao Luo, San Diego, CA (US); Yongbin Wei, San Diego, CA (US); Durga Prasad Malladi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 555 days.

(21) Appl. No.: 12/846,608

(22) Filed: Jul. 29, 2010

(65) Prior Publication Data

US 2011/0039595 A1 Feb. 17, 2011

Related U.S. Application Data

(60) Provisional application No. 61/233,352, filed on Aug. 12, 2009.

(51) Int. Cl.
*H04B 7/00* (2006.01)

(52) U.S. Cl.
USPC ............ 455/522; 455/69; 455/70; 455/67.11; 455/67.13; 455/63.1; 370/315; 370/316; 370/317; 370/318; 370/319

(58) Field of Classification Search
USPC .............. 455/522, 69–70, 67.11, 67.13, 63.1; 370/315–320
See application file for complete search history.

(56) References Cited

U.S. PATENT DOCUMENTS

2010/0234061 A1 * 9/2010 Khandekar et al. ........... 455/522

FOREIGN PATENT DOCUMENTS

WO WO2008055132 5/2008

OTHER PUBLICATIONS

International Search Report and Written Opinion—PCT/US2010/044311, International Search Authority—European Patent Office—Dec. 9, 2010.
Lucent Technologies: "Uplink Scheduling With Inter-Cell Power Control, with Extensions to Interference Coordination", 3GPP Draft; R1-063478, 3rd Generation Partnership Project (3GPP), Mobile Competence Centre ; 650, Route Des Lucioles ; F-06921 Sophia-Antipolis Cedex ; France, vol. RAN WG1, No. Riga, Latvia; 20061102, Nov. 2, 2006, XP050103914, [retrieved on Nov. 2, 2006] the whole document.

* cited by examiner

*Primary Examiner* — Fayyaz Alam
(74) *Attorney, Agent, or Firm* — Kam T. Tam

(57) ABSTRACT

Devices and methods are provided for transmit power control in a wireless communication environment. In one embodiment, the method may involve measuring an interference amount over at least one of a sub-band and a full bandwidth. The method may involve assigning a level to the measured interference amount, the level comprising one of an overloaded level and an underloaded level. The method may involve encoding the level as an overload indicator, the overload indicator being conditioned on the sub-band such that the overload indicator includes enhanced layer symbols regarding the level of the measured interference amount. The method may involve conveying the overload indicator to at least one mobile device.

49 Claims, 15 Drawing Sheets

SYSTEM AND METHOD FOR OVERLOAD INDICATION

CLAIM OF PRIORITY UNDER 35 U.S.C. §119

The present Application for patent claims priority to Provisional Application No. 61/233,352, entitled "OVERLOAD INDICATION DESIGN," filed Aug. 12, 2009, and is assigned to the assignee hereof, and is hereby expressly incorporated in its entirety by reference herein.

BACKGROUND

1. Field

The present application relates generally to wireless communications, and more specifically to systems and methods for performing transmit power control.

2. Background

The 3rd Generation Partnership Project (3GPP) Long Term Evolution (LTE) represents a major advance in cellular technology and is the next step forward in cellular 3G services as a natural evolution of Global System for Mobile communications (GSM) and Universal Mobile Telecommunications System (UMTS). LTE, in some instances referred to as Release-8 of 3GPP, provides for an uplink speed of up to 50 megabits per second (Mbps) and a downlink speed of up to 100 Mbps and brings many technical benefits to cellular networks. LTE is designed to meet carrier needs for high-speed data and media transport as well as high-capacity voice support. Bandwidth is scalable from 1.25 MHz to 20 MHz. This suits the needs of different network operators that have different bandwidth allocations, and also allows operators to provide different services based on spectrum. LTE is also expected to improve spectral efficiency in 3G networks, allowing carriers to provide more data and voice services over a given bandwidth. LTE encompasses high-speed data, multimedia unicast and multimedia broadcast services.

The LTE physical layer (PHY) is a highly efficient means of conveying both data and control information between an evolved NodeB (eNB) and mobile access terminals (ATs) or user equipment (UE). The LTE PHY employs some advanced technologies that are new to cellular applications. These include Orthogonal Frequency Division Multiplexing (OFDM) and Multiple Input Multiple Output (MIMO) data transmission. In addition, the LTE PHY uses Orthogonal Frequency Division Multiple Access (OFDMA) on the downlink (DL) and Single Carrier-Frequency Division Multiple Access (SC-FDMA) on the uplink (UL). OFDMA allows data to be directed to or from multiple users on a subcarrier-by-subcarrier basis for a specified number of symbol periods.

Overload indication is one aspect LTE, wherein an eNB measures uplink Interference over Thermal (IoT) noise. If the IoT noise is above a certain threshold, then an event is triggered where an overload indication message is sent to the eNBs of neighboring cells via a wired backhaul network (e.g., an X2 interface or the like). However, instances may occur when a given node or terminal is not capable of receiving such overload indication messages from neighboring nodes via the wired backhaul network (e.g., when the backhaul network is down). Accordingly, it would be desirable to deliver the overload indication message as an Over-The-Air (OTA) broadcast. Moreover, it would be desirable to encode the overload indication message to include both coarse and finer resolution data regarding the measured interference.

SUMMARY

In accordance with one or more embodiments and corresponding disclosure thereof, various aspects are described in connection with a transmit power control method performed by a base station or the like. The method may involve measuring an interference amount over at least one of a sub-band and a full bandwidth. The method may involve assigning a level to the measured interference amount, the level comprising one of an overloaded level and an underloaded level. The method may involve encoding the level as an overload indicator, the overload indicator being conditioned on the sub-band such that the overload indicator includes enhanced layer symbols regarding the level of the measured interference amount. The method may involve conveying the overload indicator to at least one mobile device, such as an access terminal (AT) or the like.

In related aspects, the method may involve further conditioning the overload indicator on the full bandwidth such that the overload indicator includes base layer symbols regarding the level of the measured interference amount. The base layer symbols may correspond to a coarse resolution of the interference amount while the enhanced layer symbols may correspond to a finer resolution of the interference amount measured over one of a same bandwidth as the base layer symbols and a subset thereof.

In further related aspects, encoding the level as the overload indicator may involve using a hierarchical modulation to deliver the base layer symbols and the enhanced layer symbols as a single symbol stream to the at least one AT. In yet further related aspects, an electronic device may be configured to execute the above described methodology.

In accordance with one or more embodiments and corresponding disclosure thereof, various aspects are described in connection with a transmit power control method performed by an AT or the like. The method may involve receiving an overload indicator conditioned on (a) a full bandwidth such that the overload indicator includes base layer symbols regarding a level of a measured interference amount, and (b) a sub-band such that the overload indicator includes enhanced layer symbols regarding the level of the measured interference amount. The method may involve determining a channel condition with respect to a neighboring cell. The method may involve decoding the overload indicator based at least in part on the channel condition to mitigate interference.

In related aspects, decoding the overload indicator may involve decoding the base layer symbols, in response to the channel condition failing to meet a defined threshold value. In the alternative, or in addition, decoding the overload indicator may involve decoding both the base layer symbols and the enhanced layer symbols, in response to the channel condition meeting the defined threshold value. In further related aspects, an electronic device may be configured to execute the above described methodology.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other novel features will become apparent from the following detailed description when considered in conjunction with the drawings and the disclosed aspects are intended to include all such aspects and their equivalents.

BRIEF DESCRIPTION OF THE DRAWINGS

FIG. 10 illustrates an example methodology for transmit power control at a base station or the like.

FIG. 14 illustrates an example methodology for transmit power control at an access terminal or the like.

DESCRIPTION

Figure 1:
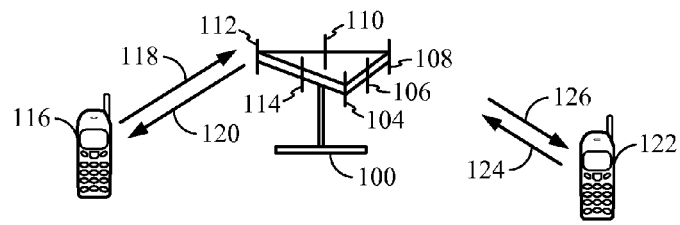
FIG. 1 illustrates a multiple access wireless communication system.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single Carrier Frequency Division Multiple Access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Referring to FIG. 1, a multiple access wireless communication system according to one embodiment is illustrated. An access point 100 (e.g., base station, evolved NodeB (eNB), or the like) includes multiple antenna groups, one including 104 and 106, another including 108 and 110, and an additional including 112 and 114. In FIG. 1, two antennas are shown for each antenna group, however, more or fewer antennas may be utilized for each antenna group. An Access Terminal (AT) 116 is in communication with the antennas 112 and 114, where the antennas 112 and 114 transmit information to the AT 116 over a forward link 120 and receive information from the AT 116 over a reverse link 118. An AT 122 is in communication with the antennas 106 and 108, where the antennas 106 and 108 transmit information to the AT 122 over a forward link 126 and receive information from the AT 122 over a reverse link 124. In a Frequency Division Duplex (FDD) system, the communication links 118, 120, 124 and 126 may use different frequency for communication. For example, the forward link 120 may use a different frequency than that used by the reverse link 118.

Each group of antennas and/or the area in which they are designed to communicate is often referred to as a sector of the access point. In the embodiment, antenna groups each are designed to communicate to ATs in a sector, of the areas covered by the access point 100.

In communication over the forward links 120 and 126, the transmitting antennas of the access point 100 utilize beamforming in order to improve the signal-to-noise ratio of forward links for the different ATs 116 and 124. Also, an access point using beamforming to transmit to ATs scattered randomly through its coverage causes less interference to ATs in neighboring cells than an access point transmitting through a single antenna to all its ATs.

An access point may be a fixed station used for communicating with the terminals and may also be referred to as an access point, a NodeB, an eNB, or some other terminology. An AT may also be referred to as a User Equipment (UE), a wireless communication device, terminal, or the like.

Figure 2:
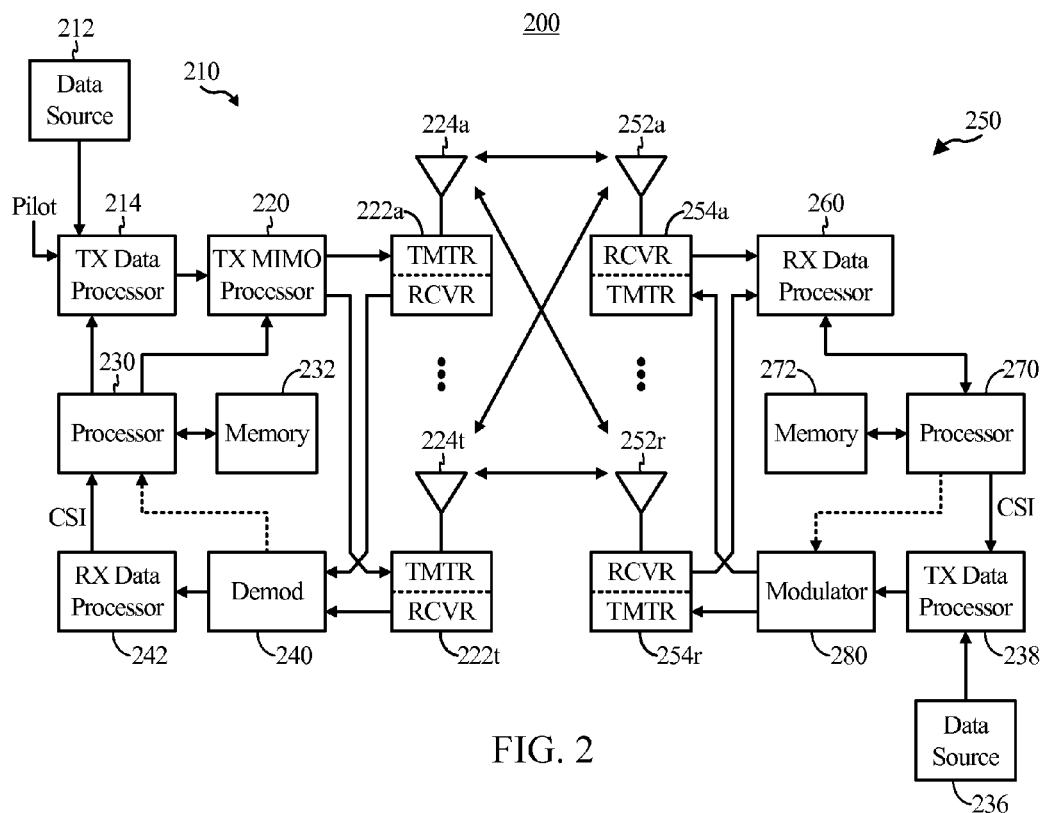
FIG. 2 illustrates a block diagram of a communication system.

FIG. 2 is a block diagram of an embodiment of a transmitter system 210 (also known as the access point) and a receiver system 250 (also known as AT) in a MIMO system 200. At the transmitter system 210, traffic data for a number of data streams is provided from a data source 212 to a transmit (TX) data processor 214.

In an embodiment, each data stream is transmitted over a respective transmit antenna. The TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., Binary Phase Shift Keying (BPSK), Quadrature Phase Shift Keying (QSPK), M-ary Phase-Shift Keying (M-PSK), or Multi-Level Quadrature Amplitude Modulation (M-QAM)) selected for that data stream to provide modulation symbols. The data rate, coding, and modulation for each data stream may be determined by instructions performed by a processor 230, which may be in operative communication with a memory 232.

The modulation symbols for the data streams are then provided to a TX MIMO processor 220, which may further process the modulation symbols (e.g., for OFDM). The TX MIMO processor 220 then provides $N_T$ modulation symbol streams to $N_T$ transmitters (TMTR) 222a through 222t. In certain embodiments, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At the receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

A RX data processor 260 then receives and processes the $N_R$ received symbol streams from the $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by the RX data processor 260 is complementary to that performed by the TX MIMO processor 220 and the TX data processor 214 at the transmitter system 210.

A processor 270 periodically determines which pre-coding matrix to use, discussed further below. The processor 270 formulates a reverse link message comprising a matrix index portion and a rank value portion, and may be in operative communication with a memory 272.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to the transmitter system 210.

At the transmitter system 210, the modulated signals from the receiver system 250 are received by the antennas 224, conditioned by the receivers 222, demodulated by a demodulator 240, and processed by a RX data processor 242 to extract the reserve link message transmitted by the receiver system 250. The processor 230 then determines which pre-coding matrix to use for determining the beamforming weights then processes the extracted message.

Figure 3:
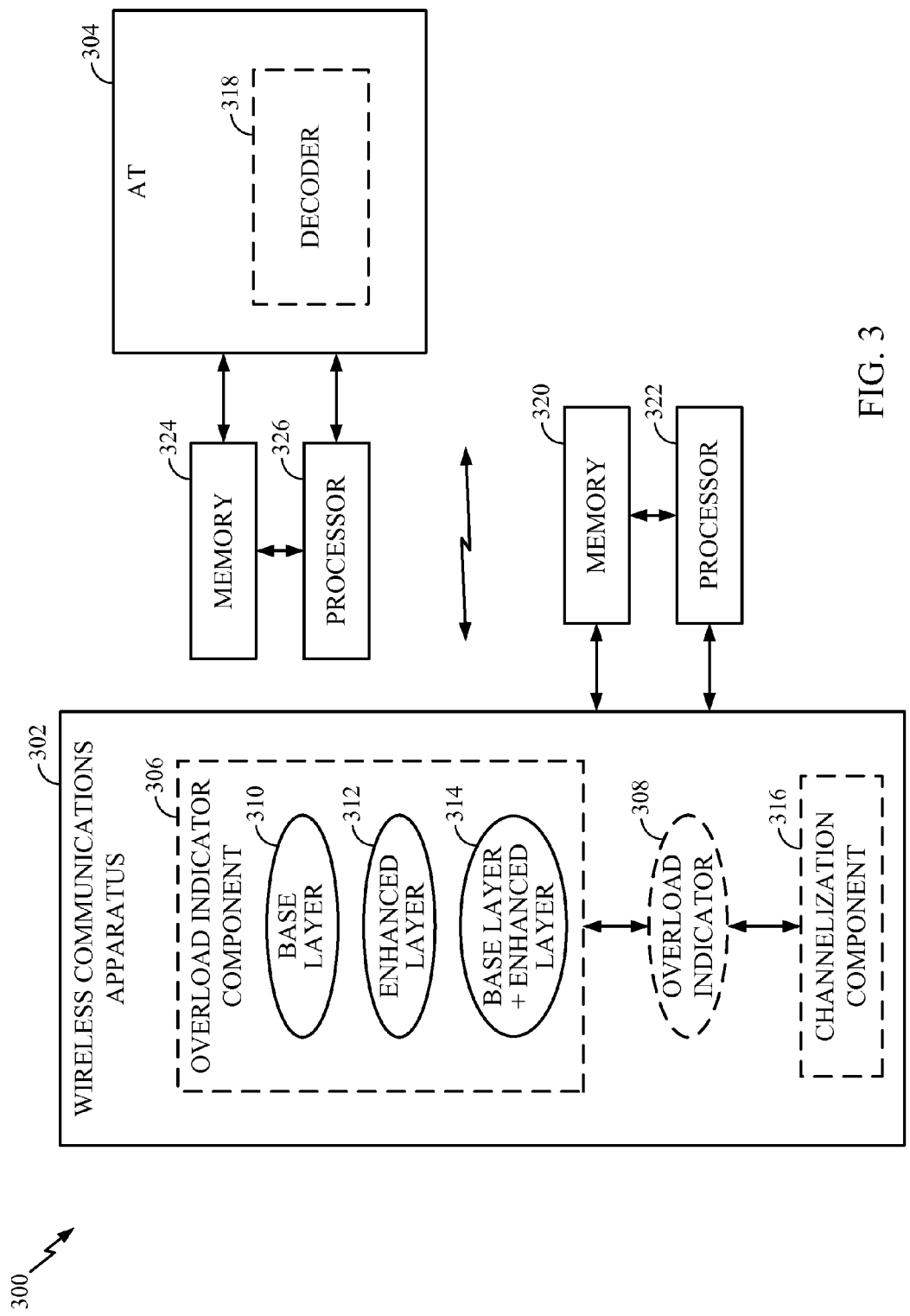
FIG. 3 illustrates an exemplary system for overload indication.

With reference to FIG. 3, illustrated is a system 300 for overload indication design, according to an aspect. The system 300 may include a wireless communication apparatus 302, which can be a base station (e.g., eNB) that communicates with at least one mobile device or an AT 304. It should be understood that although one wireless communication apparatus 302 and one AT 304 are illustrated, the system 300 can include more than one wireless communication apparatus and/or more than one AT.

Long Term Evolution (LTE) Release-8 assumes that there exists an X2 interface (e.g., backhaul network) for exchanging information regarding overload indication(s) across eNBs or the like. However, for Release-8 there is no overload indication transmission Over-The-Air (OTA). Thus, with the development of further LTE systems (e.g., LTE-A or the like), there exists a need for OTA transmission of the overload indication. An overload indication may correspond to when an eNB (e.g., the apparatus 302) measures uplink Interference over Thermal (IoT) noise. If the IoT noise is above a certain threshold, an event may be triggered, wherein an overload indication message is sent to the eNBs of neighboring cells over a backhaul network (e.g., an X2 interface).

The wireless communication apparatus 302 can include an overload indicator component 306 that is configured to measure interference and determine which indicator (e.g., overloaded, underloaded, hold, and so forth) should be conveyed to other devices in the system 300 as an overload indicator 308. In accordance with some aspects, the overload indicator 308 can indicate the interference level for different bandwidths, such as, for example, the entire (i.e., full) bandwidth or a subband (i.e., subset of the entire bandwidth).

An overload indication for the entire bandwidth provides an indication of the average interference over the entire bandwidth to determine when there is an overload condition (e.g., high interference) or a non-overload condition (e.g., low interference, acceptable interference, or the like). An overload indicator condition on the full bandwidth (base layer 310) can be a single bit (e.g., overloaded or underloaded) or it can be tri-level (e.g., overloaded, underloaded, and hold (no change)).

According to some aspects, the overload indicator 308 can be conditioned on a subband (enhanced layer 312). Each subband can have two or three or more levels of overload conditions. For example, a total 2N or 3N levels should be utilized for N subbands, where N is an integer. For example, a bandwidth of ten megahertz might be divided into two subbands of five megahertz each. Thus, an overload indication can be applied to each of the two subbands, which provides the AT 304 with more interference condition information (i.e., better resolution or more information) across the entire bandwidth. It should be noted that although one AT 304 is illustrated and described, the system 300 can include more than one AT 304.

In accordance with some aspects, the overload indicator component 306 can be configured to provide an overload indicator that is a mix of both full bandwidth and subband (i.e., base layer plus enhanced layer 314). The wireless communication apparatus 302 can send one indication over full bandwidth and, in addition, the apparatus 302 can send overload indication over subband(s). Thus, the overload indication can be divided into at least two layers: a base layer and an enhanced layer.

The wireless communication apparatus 302 may also include a channelization component 316 that is configured to convey the overload indicator 308 to other devices in the system 300 (e.g., the AT 304, other ATs, neighboring eNBs, etc.). The channelization component 316 can be configured to the send base layer 310, the enhanced layer 312, or combinations thereof (e.g., the base layer plus the enhanced layer 314) to the other devices in the system.

In accordance with some aspects, the overload indicator 308 can be sent by the channelization component 316 using modulation symbols with coding or repetition over frequency or time. Examples of encoding include repetition coding, Reed-Muller coding, Tail-Biting Convolutional Code (TBCC), or the like. In another example, hierarchical modulation can be used to deliver the base layer 310, the enhanced layer 312, or combinations thereof. The AT 304 with good channel condition with respect to a neighboring cell (not shown) may use a decoder 318 to decode the base layer plus enhanced layer 314. However, the AT 304 with poor channel conditions with respect to a neighboring cell may use the decoder 318 to decode just the base layer 310. In related aspects, blind decoding or the like may be utilized by AT 304.

In accordance with some aspects, the overload indicator 308 in the base layer 310 and the enhanced layer 314 can be time-division multiplexed or frequency-division multiplexed (e.g., different channelization). According to some aspects, the overload indicator 308 in the base layer 310 and the enhanced layer 314 can be conveyed with different periodicities. For example, the base layer 310 can be sent every ten milliseconds and the enhanced layer 312 can be sent every two milliseconds, or vice versa, or based on other periodicities.

The overload indicator 308 may be conveyed by each wireless communication apparatus 302 (e.g., each eNB). Further, the AT 304 is listening to a neighboring eNB's overload indicator, rather than listening to its serving cell. Thus, the AT 304 at the cell edge is better able to listen to the neighboring eNB, as compared to when the AT 304 is in the center of serving cell. Thus, if hierarchical modulation is applied, different ATs with different channel conditions can decode the base layer 310 and/or enhanced layer 312.

A hierarchical modulation can be defined as: $h*Xb+g*Xe$, where Xb and Xe are modulation symbols, wherein Xb corresponds to the base layer 310 and Xe corresponds to the enhanced layer 312, and coefficients h and g are scaling factors to adjust power ratio of different layers. For example, modulation symbols Xb and Xe may comprise BPSK, QPSK, 8-PSK, 16-Quadrature Amplitude Modulation (QAM), 64-QAM or 356-QAM (define these). Additionally, modulation symbols Xb and Xe do not need to have the same modulation.

In one embodiment, one choice can be hierarchical modulation (the base layer plus the enhanced layer 314), another choice can be TDM or FDM. A third choice can be to determine how often to send the overload indicator 308. In accordance with some aspects, the choice of whether to send the base layer and/or the enhanced layer at different times, frequencies, together, and so forth, can be made by the wireless communication apparatus 302 as a function of the number of the ATs in the system, interference level(s), and/or based on other parameters. According to some aspects, the manner of sending the overload indicator 308 can be predetermined or predefined.

In related aspects, variations of hierarchical modulation may be implemented. The base layer and the enhanced layer can be decoupled, wherein the enhanced layer provides higher resolution of overloading conditions. For example, BPSK can be utilized for the base layer and QPSK or 8-PSK or 16-QAM or 64-QAM can be utilized for the enhanced layer. Thus, one bit of information can be carried for the base layer and two or more bits can be used for each subband. For example, if the bandwidth is ten megahertz and there are six subbands, then there can be twelve or more bits sent for enhanced layer. In another example, QPSK can be used for the base layer and 8-PSK or 16-QAM or 64-QAM can be used for the enhanced layer. Thus, two bits can be utilized for the base layer and three, or four, or six bits for the enhanced layer. In a further example, 8-PSK can be utilized for the base layer and 16-QAM or 64-QAM for the enhanced layer.

The above paragraph refers to the condition when the base layer and the enhanced layer are decoupled. The following will discuss when the base layer and the enhanced layer are coupled together, wherein the enhanced layer provides higher resolution for its associated subband in the base layer. For example, QPSK can be utilized for the base layer and QPSK or 8-PSK or 16-QAM or 64-QAM can be utilized for the enhanced layer (e.g., two subbands in the base layer, and within each subband, dividing that subband further into two, three, four, or six subbands).

In accordance with some aspects, combinations other than the base layer plus the enhanced layer may be utilized. For example, overload indicator can be for the base layer plus a first enhanced layer plus a second enhanced layer, and so forth. Further, hierarchical modulation may be for two layers or multiple layers. According to some aspects, for hierarchical modulation, different power ratios between different layers can be adjusted by the wireless communication apparatus 302 to control a coverage range.

The system 300 can include a memory 320 operatively coupled to the wireless communication apparatus 302. The memory 320 can be external to the apparatus 302 or can reside within the apparatus 302. The memory 320 can store instructions related to determining an interference amount in a wireless communications environment, assigning a level to the measured interference amount, encoding the level assigned as an overload indicator, and transmitting the overload indicator to at least one device in the wireless communications environment.

In related aspects, the memory 320 may retain instructions related to conditioning the overload indicator on a full bandwidth, wherein overload indicator is a single bit. Instructions related to assigning the level to the measured interference amount may involve assigning an overloaded level or an underloaded level with the single bit. In further aspects, the memory 320 may retain instructions related to conditioning the overload indicator on a full bandwidth, wherein overload indicator comprises a plurality of levels. Instructions related to assigning the level to the measured interference amount may involve assigning an overloaded level, an underloaded level, or a hold level with a plurality of levels. In yet further related aspects, the memory 320 may retain further instructions related to conditioning the overload indicator on at least two subbands, wherein each of the at least two subbands has two or more levels of overload conditions.

At least one processor 322 can be operatively coupled to the wireless communication apparatus 302, and/or memory 320, to facilitate analysis of information related to overload indicators in a communication network. The processor 322 can be a processor dedicated to analyzing and/or generating information received by the apparatus 302, a processor that controls one or more components of the system 300, and/or a processor that both analyzes and generates information received by the AT 304 and controls one or more components of the system 300.

In related aspects, the processor 322 may be configured to convey an overload indicator. The processor 322 can include a first module for measuring an interference amount in a wireless communications environment. The processor 322 can also include a second module for assigning a level to the measured interference amount, as well as a third module for encoding the level assigned as the overload indicator. Further, the processor 322 can include a fourth module for conveying the overload indicator to at least one device in the wireless communications environment.

Further, the system 300 can include a memory 324 operatively coupled to the AT 304. The memory 324 can be external to the AT 304 or can reside within the AT 304. The memory 324 can store instructions related to receiving an overload indicator, wherein the overload indicator includes a base layer, an enhanced layer, or combinations thereof. The memory 324 can also store instructions related to decoding the overload indicator to mitigate interference in a wireless communications environment.

At least one processor 326 can be operatively coupled to the AT 304, and/or the memory 324, to facilitate analysis of information related to overload indicators in a communications environment. The processor 326 can be a processor dedicated to analyzing and/or generating information received by the AT 304, a processor that controls one or more components of the system 300, and/or a processor that both analyzes and generates information received by the AT 304 and controls one or more components of the system 300.

In related aspects, the processor 326 may be configured to receive an overload indicator. The processor 326 can include a first module for receiving the overload indicator, wherein the overload indicator includes a base layer, an enhanced layer, or combinations thereof. The processor 326 can also include a second module for decoding the overload indicator to mitigate interference in a wireless communications environment.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 4:
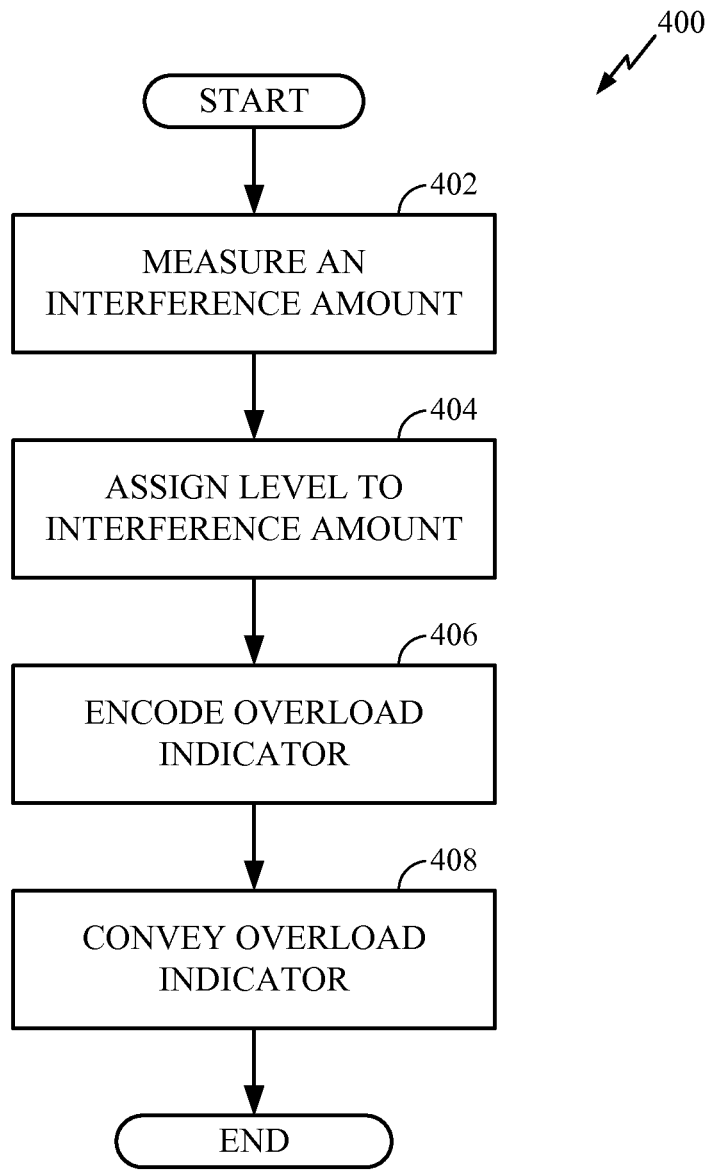
FIG. 4 illustrates an exemplary method for conveying an overload indicator.

FIG. 4 illustrates a method 400 for conveying an overload indicator. At 402, an interference amount in a wireless communications environment is measured. Based on the measured interference amount, at 404, a level is assigned (e.g., overload, underload, or hold). At 406, the level assigned is encoded as an overload indicator.

In related aspects, the method 400 may involve conditioning the overload indicator on a full bandwidth, wherein the overload indicator comprises a single bit. Assigning the level to the measured interference amount may further comprise assigning an overloaded level or an underloaded level with the single bit. In further related aspects, the method 400 may involve conditioning the overload indicator on a full bandwidth, wherein the overload indicator comprises a plurality of levels. Assigning the level to the measured interference amount may further comprise assigning an overloaded level, an underloaded level, or a hold level with the plurality of levels. In yet further related aspects, the method 400 may involve conditioning the overload indicator on at least two subbands, wherein each of the at least two subbands has two or more levels of overload conditions.

The overload indicator may be conveyed to one or more devices, at 408. In related aspects, conveying the overload indicator to the at least one device in the wireless communications environment may comprise conveying a base layer, an enhanced layer, or combinations thereof. In further related aspects, conveying the overload indicator to the at least one device in wireless communications environment may comprise applying a hierarchical modulation to deliver a base layer and an enhanced layer to the at least one device and at least a second device, wherein the one device and the second device have different channel conditions.

In related aspects, conveying the overload indicator to the at least one device in wireless communications environment may comprise utilizing different channelizations to convey a base layer, an enhanced layer, or combinations thereof. In further related aspects, conveying the overload indicator to the at least one device in wireless communications environment may comprise utilizing different periodicities to convey a base layer and an enhanced layer. In yet further related aspects, conveying the overload indicator may comprise utilizing a hierarchical modulation. The hierarchical modulation may be used to deliver the base layer and the enhanced layer for ATs with different channel conditions.

In an aspect, the method 400 can include adjusting power ratios between at least two layers to control a coverage range. In accordance with some aspects, a processor executing computer executable instructions stored on a computer readable storage medium is employed to implement the method 400. In related aspects, a computer program product can include a computer-readable medium that comprises codes for carrying out various aspects of the method 400. The computer-readable medium can include a first set of codes for causing a computer to determine an interference amount in a wireless communications environment. The computer-readable medium can also include a second set of codes for causing the computer to assign a level to the measured interference amount and a third set of codes for causing the computer to encode the level assigned as an overload indicator. Further, the computer-readable medium can include a fourth set of codes for causing the computer to communicate the overload indicator to at least one device in the wireless communications environment.

Figure 5:
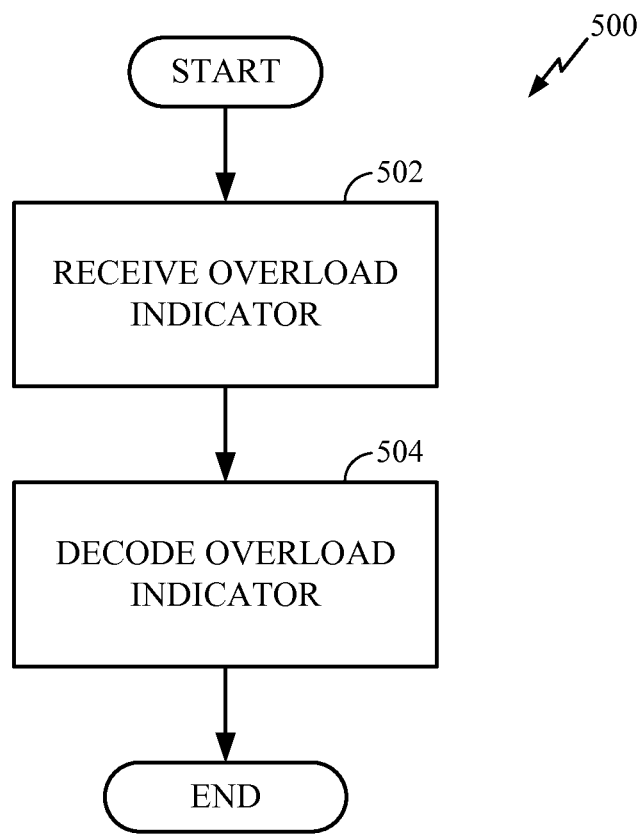
FIG. 5 illustrates an exemplary method for receiving an overload indicator.

FIG. 5 illustrates a method 500 for receiving an overload indicator. At 502, an overload indicator is received. The overload indicator can include a base layer, an enhanced layer, or combinations thereof. At 504, the overload indicator is decoded in order to mitigate interference in a wireless communications environment. In related aspects, decoding can include decoding the base layer, the enhanced layer, or combinations thereof, if there is a good channel condition with respect to a neighboring cell in the wireless communications environment. In further related aspects, decoding can include decoding the base layer if there is a poor channel condition with respect to a neighboring cell in the wireless communications environment. In yet further related aspects, a processor executing computer executable instructions stored on a computer readable storage medium is employed to implement the method 400.

In related aspects, a computer program product can include a computer-readable medium that comprises codes for carrying out various aspects of the method 500. The computer-readable medium can include a first set of codes for causing a computer to receive an overload indicator, wherein the overload indicator includes a base layer, an enhanced layer, or combinations thereof. The computer-readable medium can also include a second set of codes for causing the computer to decode the overload indicator to mitigate interference in a wireless communications environment.

In further related aspects, the computer-readable medium can include a second set of codes for decoding the base layer, the enhanced layer, or combinations thereof, if there is a good channel condition with respect to a neighboring cell in wireless communications environment. According to some aspects, the second set of codes may relate to decoding the base layer if there is a poor channel condition with respect to a neighboring cell in the wireless communications environment.

Figure 6:
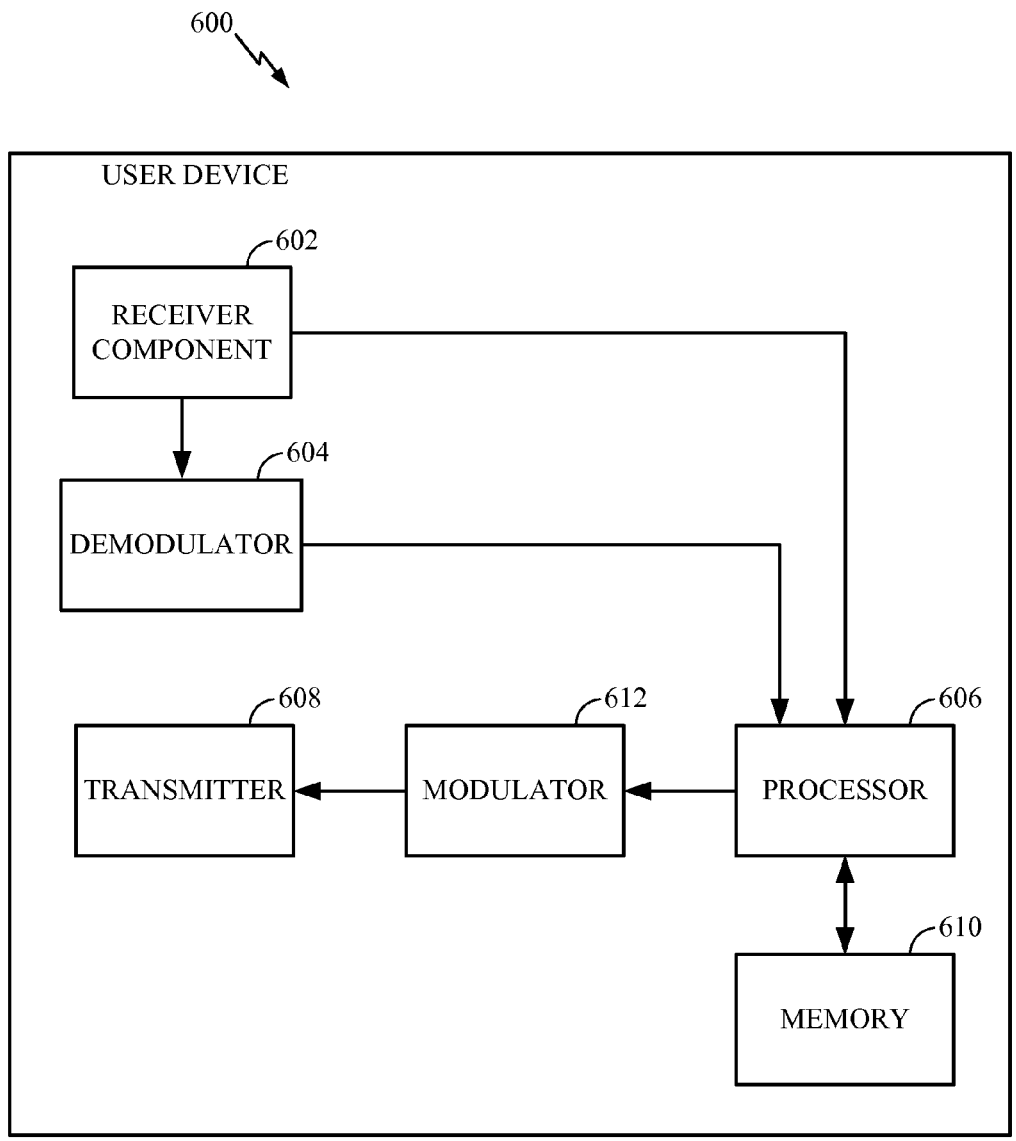
FIG. 6 illustrates a system that facilitates receiving an overload indicator in accordance with one or more of the disclosed aspects.

With reference now to FIG. 6, illustrated is a system 600 that facilitates receiving an overload indicator in accordance with one or more of the disclosed aspects. The system 600 can reside in a user device (e.g., an AT). The system 600 may comprise a receiver component 602 that can receive a signal from, for example, a receiver antenna. The receiver component 602 can perform typical actions thereon, such as filtering, amplifying, downconverting, etc. the received signal. The receiver component 602 can also digitize the conditioned signal to obtain samples. A demodulator 604 can obtain received symbols for each symbol period, as well as provide received symbols to a processor 606.

The processor 606 can be a processor dedicated to analyzing information received by the receiver component 602 and/or generating information for transmission by a transmitter 608. In addition, or alternatively, the processor 606 can control one or more components of the system 600, analyze information received by the receiver component 602, generate information for transmission by the transmitter 608, and/or control one or more components of the system 600. The processor 606 may include a controller component capable of coordinating communications with additional user devices.

The system 600 can additionally comprise a memory 610 operatively coupled to the processor 606. The memory 610 can store information related to coordinating communications and any other suitable information. The memory 610 can additionally store protocols associated with resource mapping. It will be appreciated that data store components (e.g., memories) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 610 of the various aspects is intended to comprise, without being limited to, these and any other suitable types of memory. The system 600 can further include a symbol modulator 612, wherein the transmitter 608 transmits the modulated signal.

Figure 7:
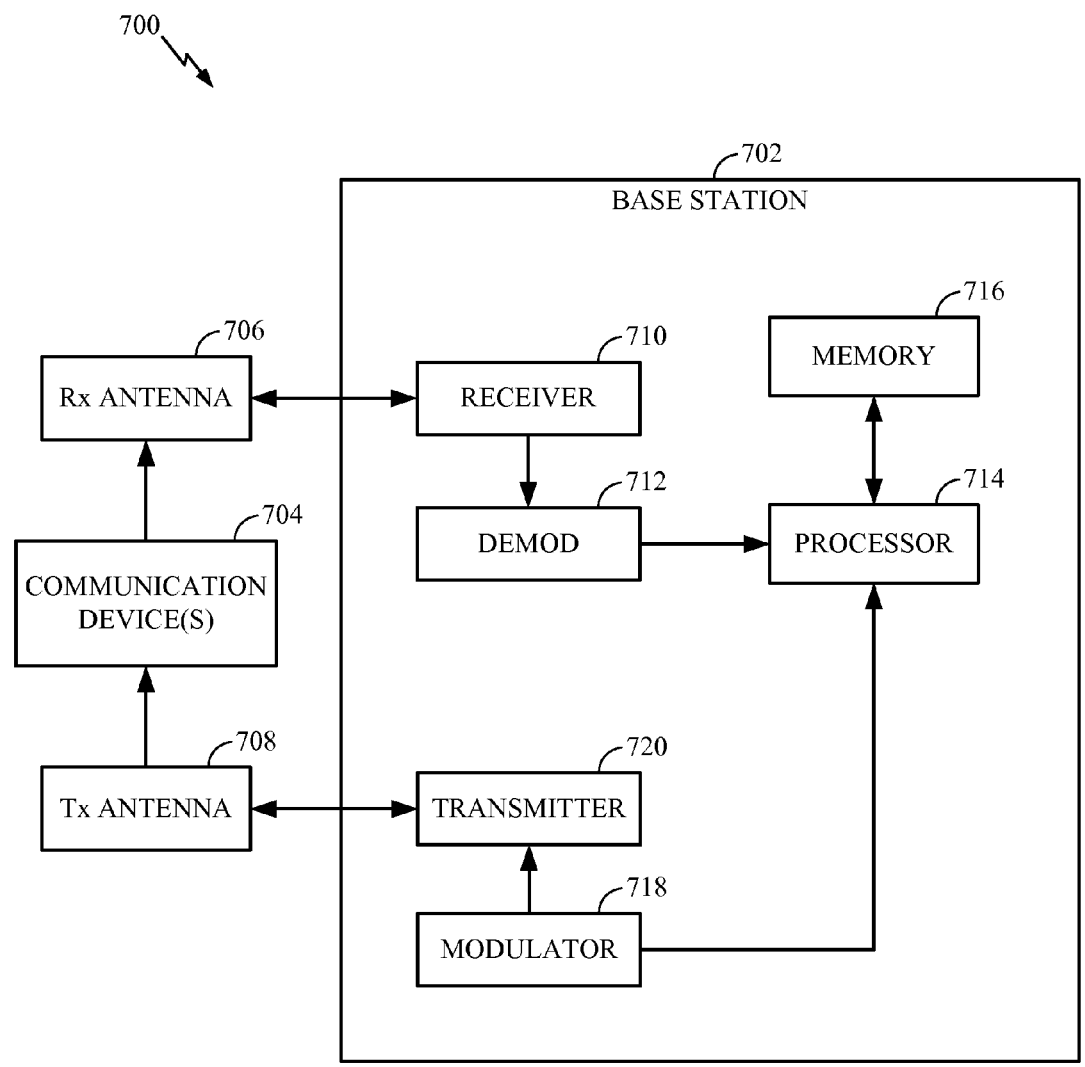
FIG. 7 illustrates a system that facilitates transmitting an overload indicator over the air in accordance with various aspects presented herein.

FIG. 7 illustrates a system 700 that facilitates transmitting an overload indicator over the air in accordance with various aspects presented herein. The system 700 may comprise a base station 702 or access point. As illustrated, the base station 702 receives signal(s) from one or more communication device(s) 704 (e.g., user device) via a receive antenna 706, and transmits to the one or more communication devices 704 via a transmit antenna 708.

The base station 702 may comprise a receiver 710 that receives information from the receive antenna 706 and may be operatively coupled to a demodulator 712 that demodulates the received information. The demodulated symbols may be analyzed by a processor 714 that is coupled to a memory 716 that stores information related to resource mapping. A modulator 718 can multiplex the signal for transmission by a transmitter 720 through the transmit antenna 708 to the communication device(s) 704.

Figure 8:
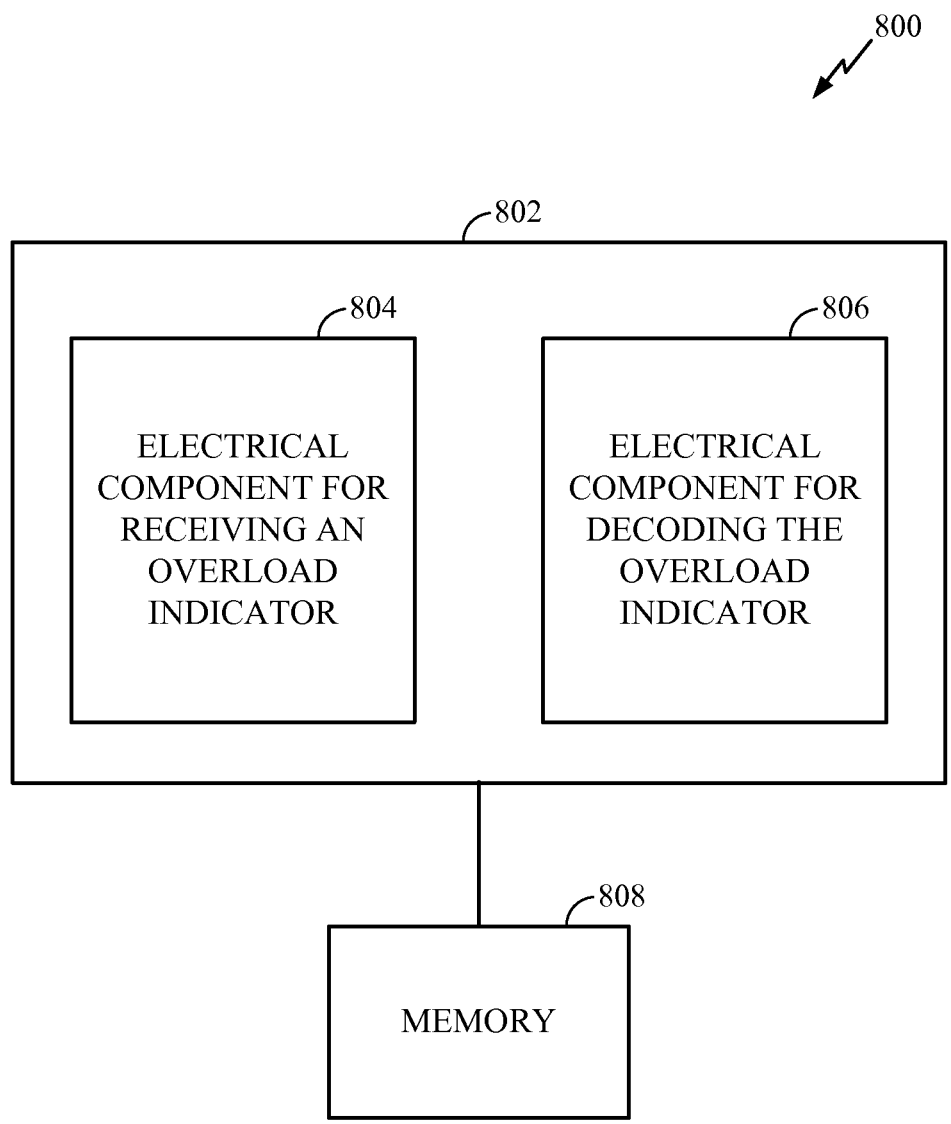
FIG. 8 illustrates an exemplary system for receiving an overload indicator.

With reference to FIG. 8, illustrated is an example system 800 for receiving an overload indicator. The system 800 may reside at least partially within an AT. It is noted that the system 800 is represented as including functional blocks, which may be functional blocks that represent functions implemented by a processor, software, or a combination thereof (e.g., firmware). The system 800 may include a logical grouping 802 of electrical components that can act separately or in conjunction with each other. The logical grouping 802 may include an electrical component 804 for receiving an overload indicator, which can include a base layer, an enhanced layer, or combinations thereof.

The logical grouping 802 can also include an electrical component 806 for decoding the overload indicator to mitigate interference in the wireless communications environment. In related aspects, the electrical component 806 may decode the base layer, the enhanced layer, or combinations thereof, if the channel condition is good with respect to a neighboring cell in the wireless communications environment (e.g., if the channel condition meets a defined standard or value). In further related aspects, the electrical component 806 may decode just the base layer if the channel condition is poor with respect to a neighboring cell in the wireless communications environment (e.g., if the channel condition fails to meet the defined standard or value).

The system 800 can include a memory 808 that retains instructions for executing functions associated with the electrical components 804 and 806 or other components. While shown as being external to the memory 808, it is to be understood that one or more of the electrical components 804 and 806 may exist within the memory 808.

Figure 9:
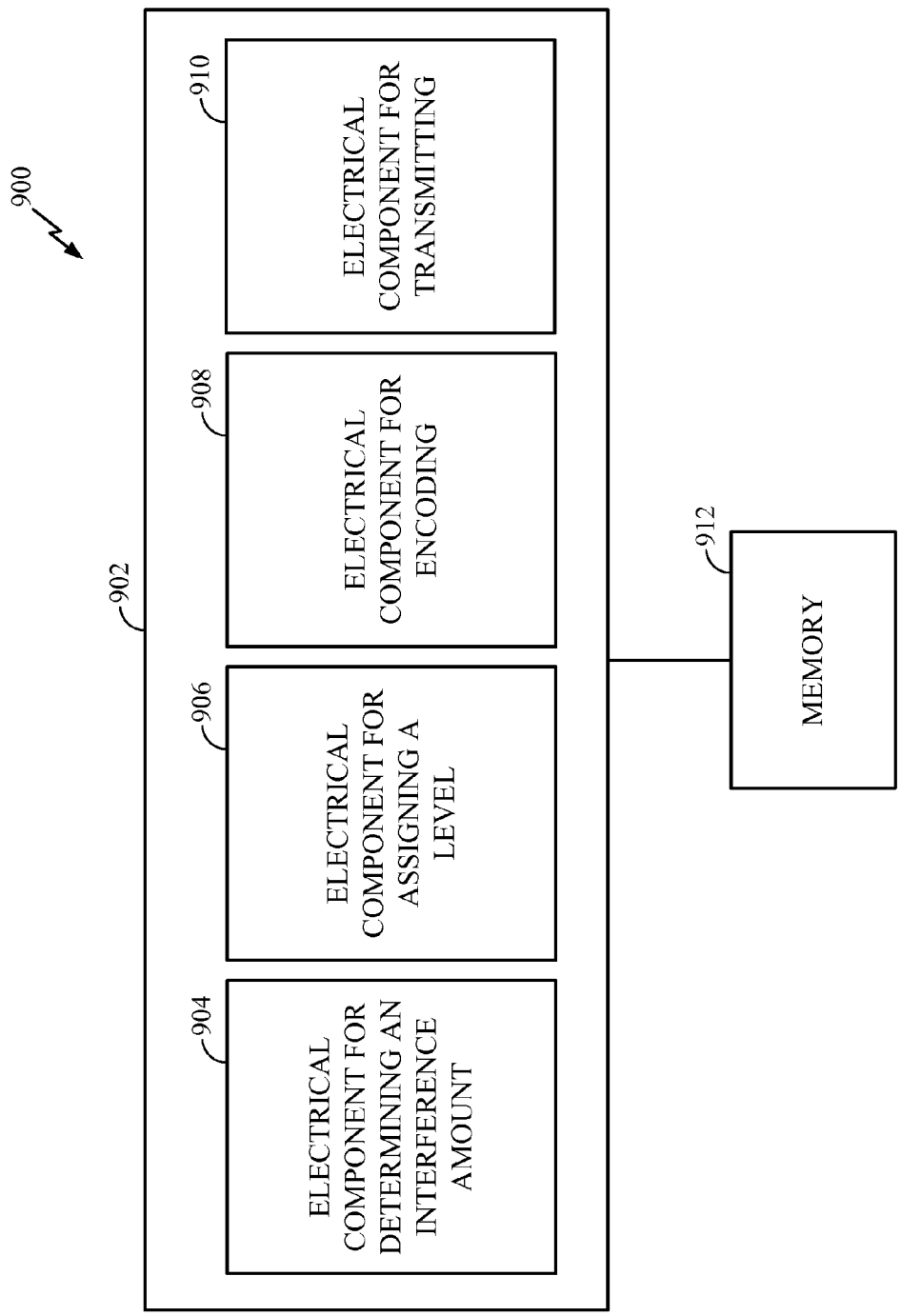
FIG. 9 illustrates an exemplary system for conveying an overload indicator.

FIG. 9 illustrates an example system 900 for conveying an overload indicator. The system 900 may reside at least partially within a base station. It is to be appreciated that the system 900 is represented as including functional blocks, which may be functional blocks that represent functions implemented by a processor, software, or a combination thereof.

The system 900 may include a logical grouping 902 of electrical components that can act separately or in conjunction with each other. The logical grouping 902 may include an electrical component 904 for measuring an interference amount in a wireless communications environment. Also included is an electrical component 906 for assigning a level to the measured interference amount. Further, the logical grouping 902 may include an electrical component 908 for encoding the level assigned as an overload indicator.

Also included in the logical grouping 902 is an electrical component 910 for conveying the overload indicator to at least one device in the wireless communications environment. The electrical component 910 can convey a base layer, an enhanced layer, or combinations thereof. In related aspects, the electrical component 910 may apply a hierarchical modulation to deliver a base layer and an enhanced layer to a first device and a second device, wherein the first device and the second device have different channel conditions. According to other aspects, the electrical component 910 may utilize different channelizations to convey a base layer, an enhanced layer, or combinations thereof. According to some aspects, the electrical component 910 may utilize different periodicities to convey a base layer and an enhanced layer.

In related aspects, the logical grouping 902 may include an electrical component for conditioning the overload indicator on a full bandwidth, wherein the overload indicator comprises a single bit. The electrical component 906 may assign an overloaded level or an underloaded level with the single bit. In further related aspects, the logical grouping 902 may include an electrical component for conditioning the overload indicator on a full bandwidth, wherein the overload indicator comprises a plurality of levels. The electrical component 906 may assign an overloaded level, an underloaded level, or a hold level with the plurality of levels.

In yet further related aspects, the logical grouping 902 may include an electrical component for conditioning the overload indicator on at least two subbands, wherein each of the at least two subbands has two or more levels of overload conditions. In still further related aspects, the logical grouping 902 may include an electrical component for adjusting power ratios between at least two layers to control a coverage range.

Additionally, the system 900 can include a memory 912 that retains instructions for executing functions associated with electrical components 904, 906, 908, and 910, or other components. While shown as being external to memory 912, it is to be understood that one or more of electrical components 904, 906, 908, and 910 may exist within memory 912.

In accordance with an aspect, there is provided a method for conveying an overload indicator in a wireless communications environment. The method may include employing a processor executing computer executable instructions stored on a computer readable storage medium to implement following acts: measuring an interference amount in wireless communications environment, and assigning a level to measured interference amount. Further, the method may include encoding the level assigned as the overload indicator, and conveying overload indicator to at least one device in the wireless communications environment.

According to another aspect, there is provided a wireless communication apparatus that includes a memory and a processor. The memory may retain instructions related to determining an interference amount in a wireless communications environment and assigning a level to the measured interference amount. The memory may retain instructions related to encoding the level assigned as an overload indicator, and transmitting the overload indicator to at least one device in the wireless communications environment. The processor may be coupled to memory and configured to execute one or more of the instructions retained in the memory.

A further aspect relates to an apparatus operable in a wireless communication system. The apparatus may include a means for measuring an interference amount, and a means for assigning a level to the measured interference amount. The apparatus may also include a means for encoding the level assigned as an overload indicator, and a means for conveying the overload indicator to at least one device in the wireless communications environment. In accordance with some aspects, the apparatus may also include a means for adjusting power ratios between at least two layers to control a coverage range. Additionally or alternatively, the apparatus may include a means for conditioning the overload indicator.

According to another aspect, there is provided a computer program product, comprising a computer-readable medium. Included in the computer-readable medium is a first set of codes for causing a computer to determine an interference amount in a wireless communications environment, and a second set of codes for causing the computer to assign a level to measured interference amount. The computer-readable medium may also include a third set of codes for causing the computer to encode the level assigned as an overload indicator, as well as a fourth set of codes for causing the computer to communicate the overload indicator to at least one device in the wireless communications environment.

Still another aspect relates to at least one processor configured to convey an overload indicator. The at least one processor may include a first module or component for measuring an interference amount in a wireless communications environment, and a second module for assigning a level to measured interference amount. The at least one processor may also include a third module for encoding the level assigned as an overload indicator, and a fourth module for conveying the overload indicator to at least one device in the wireless communications environment.

According to another aspect, there is provided a method that may involve employing a processor executing computer executable instructions stored on a computer readable storage medium to implement following acts. The method may also involve receiving an overload indicator, wherein the overload indicator includes a base layer, an enhanced layer, or combinations thereof. The method may also involve decoding the overload indicator to mitigate interference in the wireless communications environment.

Another aspect relates to a wireless communication apparatus that includes a memory and a processor. The memory may retain instructions related to receiving an overload indicator, wherein the overload indicator includes a base layer, an enhanced layer, or combinations thereof. The memory may also retain instructions related to decoding overload indicator to mitigate interference in a wireless communications environment. The processor may be coupled to the memory and configured to execute one or more of the instructions retained in memory.

Yet another aspect relates to an apparatus operable in wireless communication system. The apparatus may include a means for receiving an overload indicator, wherein the overload indicator includes a base layer, an enhanced layer, or combinations thereof. The apparatus may also include a means for decoding the overload indicator to mitigate interference in the wireless communications environment.

A further aspect relates to a computer program product, comprising a computer-readable medium. Included in the computer-readable medium is a first set of codes for causing a computer to receive an overload indicator, wherein the overload indicator includes a base layer, an enhanced layer, or combinations thereof. The computer-readable medium may also include a second set of codes for causing the computer to decode the overload indicator to mitigate interference in a wireless communications environment.

Still, another aspect relates to at least one processor configured to receive an overload indicator. The at least one processor may include a first module for receiving an overload indicator, wherein the overload indicator includes a base layer, an enhanced layer, or combinations thereof. The at least one processor may also include a second module for decoding the overload indicator to mitigate interference in a wireless communications environment.

Figure 10:
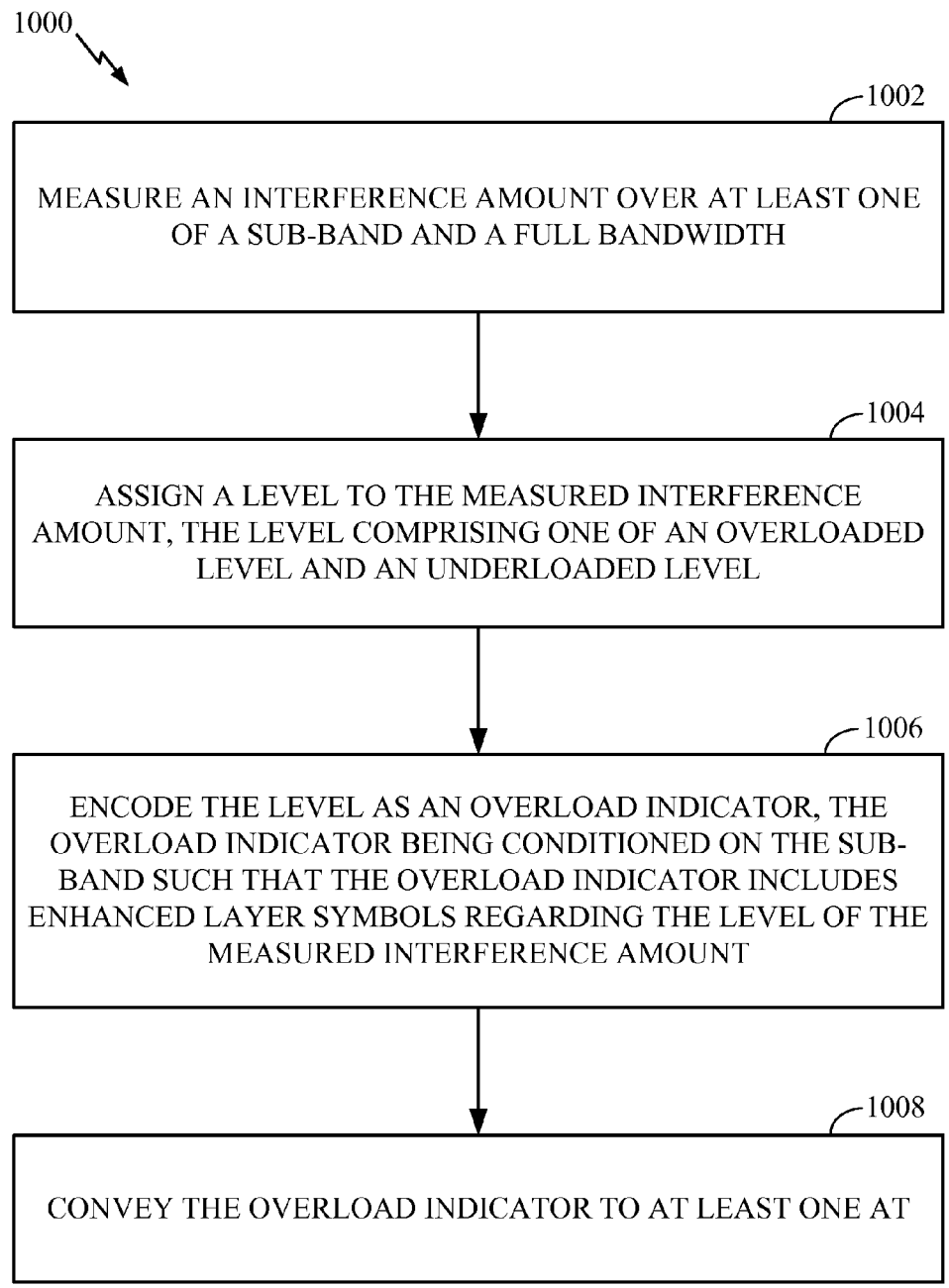

In accordance with aspects of the subject of this disclosure, there are provided methods for transmit power control a wireless communication environment. With reference to FIG. 10, illustrated is a methodology 1000 that may be performed at a wireless communication apparatus, such as a base station (e.g., eNB, macro base station, femto base station, etc.) that communicates with at least one mobile device, such as an AT. At 1002, an interference amount is measured over at least one of a sub-band and a full bandwidth. At 1004, a level is assigned to the measured interference amount, the level comprising one of an overloaded level, an underloaded level, and/or a hold level. At 1006, the level is encoded as an overload indicator, the overload indicator being conditioned on the sub-band such that the overload indicator includes enhanced layer symbols regarding the level of the measured interference amount. At 1008, the overload indicator is conveyed to at least one AT.

Figure 11:
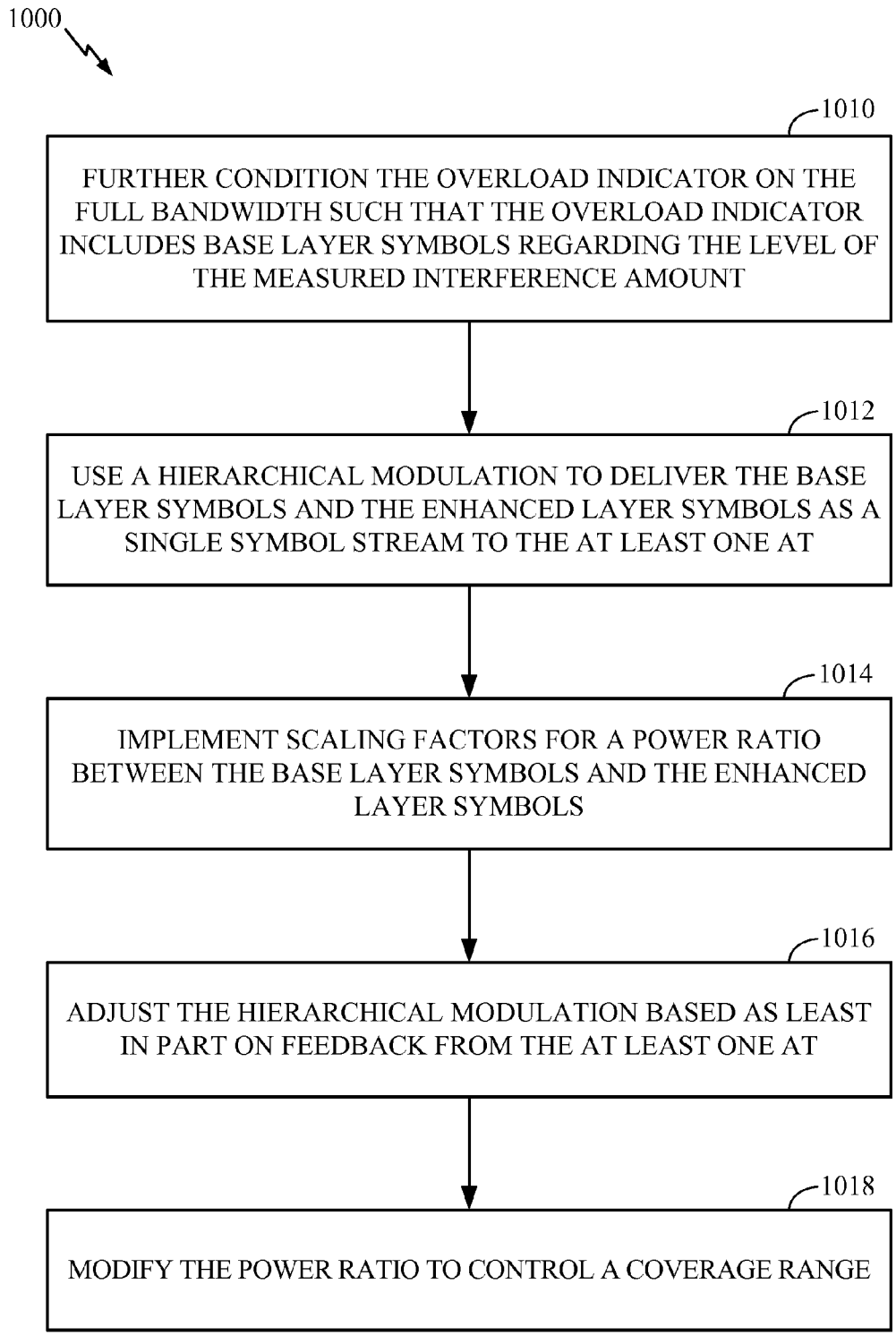
FIGS. 11-12 illustrate further aspects of the methodology of FIG. 10.

With reference to FIG. 11, the method 1000 may involve, at 1010, further conditioning the overload indicator on the full bandwidth such that the overload indicator includes base layer symbols regarding the level of the measured interference amount. In related aspects, the base layer symbols may correspond to a coarse resolution of the interference amount while the enhanced layer symbols correspond to a finer resolution of the interference amount measured over one of a same bandwidth as the base layer symbols and a subset thereof.

Encoding the level as the overload indicator may comprise, at 1012, using a hierarchical modulation to deliver the base layer symbols and the enhanced layer symbols as a single symbol stream to the at least one AT. Using the hierarchical modulation may comprise, at 1014, implementing scaling factors for a power ratio between the base layer symbols and the enhanced layer symbols. The method 1000 may involve, at 1016, adjusting the hierarchical modulation based as least in part on feedback from the at least one AT. The method 1000 may involve, at 1018, adjusting the hierarchical modulation comprises modifying the power ratio to control a coverage range.

Figure 12:
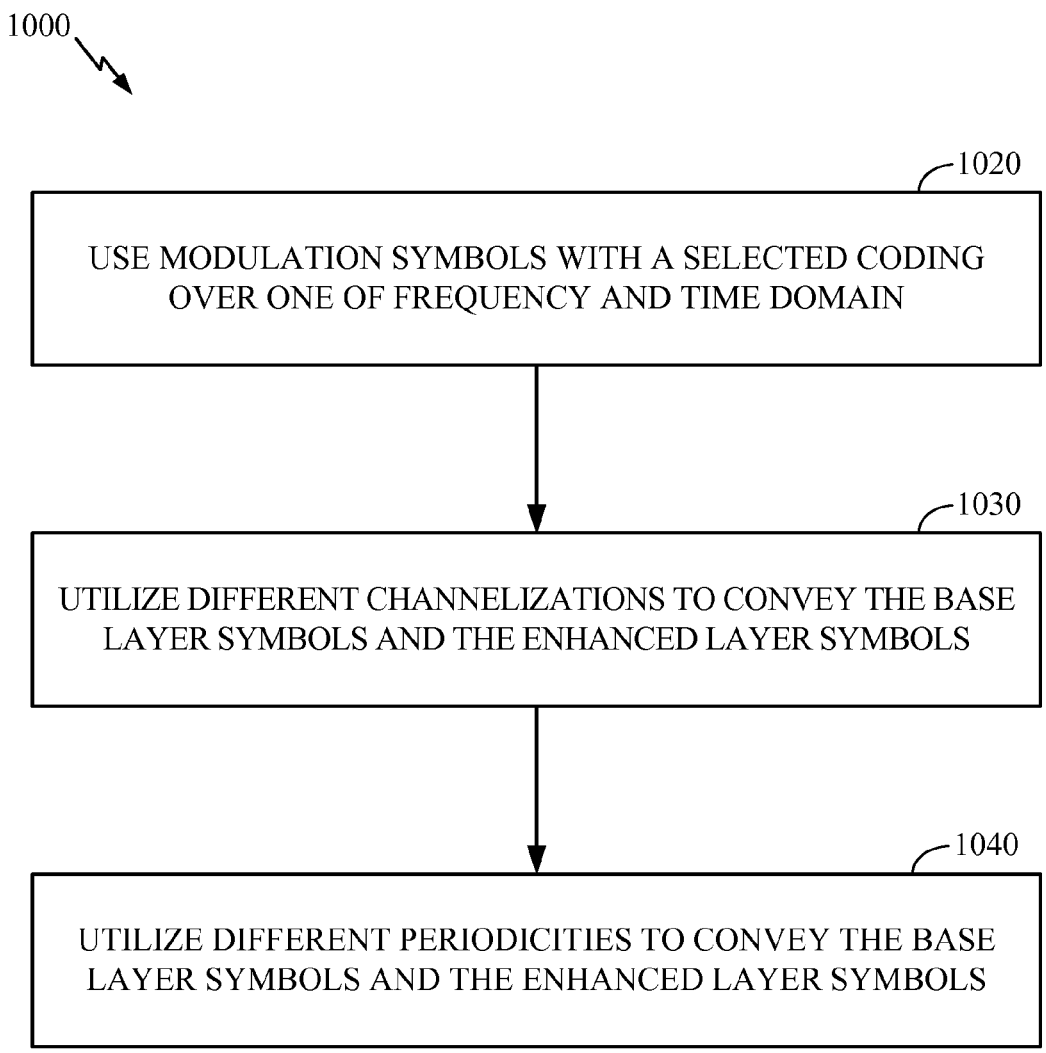

With reference to FIG. 12, conveying the overload indicator may comprise, at 1020, using modulation symbols with a selected coding over one of frequency and time domain. The selected coding may include at least one of repetition coding, Reed-Muller coding, and Tail-Biting Convolutional Code (TBCC). Conveying the overload indicator may comprise, at 1030, utilizing different channelizations to convey the base layer symbols and the enhanced layer symbols. The different channelizations include at least one of Time Division Multiplexing (TDM) and Frequency Division Multiplexing (FDM). Conveying the overload indicator may comprise, at 1040, utilizing different periodicities to convey the base layer symbols and the enhanced layer symbols.

Figure 13:
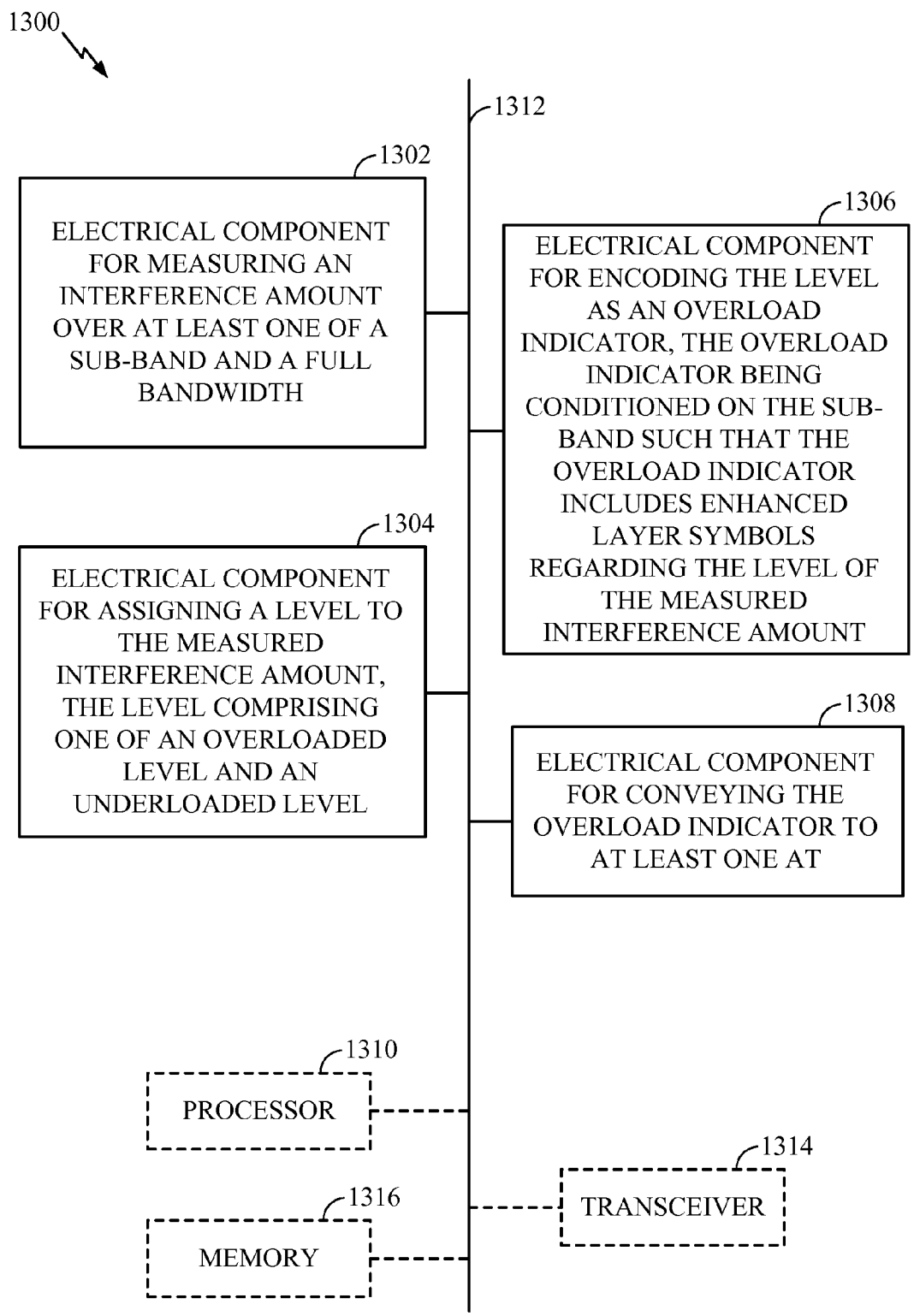
FIG. 13 shows an exemplary apparatus for transmit power control.

In accordance with one or more aspects of the embodiments described herein, there are provided devices and apparatuses for transmit power control a wireless communication environment. With reference to FIG. 13, there is provided an exemplary apparatus 1300 that may be configured as a base station or as a processor or similar device for use within the base station. As depicted, the apparatus 1300 may include functional blocks that can represent functions implemented by a processor, software, or combination thereof (e.g., firmware).

As illustrated, in one embodiment, the apparatus 1300 may comprise an electrical component or module 1302 for measuring an interference amount over at least one of a sub-band and a full bandwidth. The apparatus 1300 may comprise an electrical component 1304 for assigning a level to the measured interference amount, the level comprising one of an overloaded level and an underloaded level. The apparatus 1300 may comprise an electrical component 1306 for encoding the level as an overload indicator, the overload indicator being conditioned on the sub-band such that the overload indicator includes enhanced layer symbols regarding the level of the measured interference amount. The apparatus 1300 may comprise an electrical component 1308 for conveying the overload indicator to at least one AT.

In related aspects, the apparatus 1300 may optionally include a processor component 1310 having at least one processor, in the case of the apparatus 1300 configured as a communication network entity, rather than as a processor. The processor 1310, in such case, may be in operative communication with the components 1302-1308 via a bus 1312 or similar communication coupling. The processor 1310 may effect initiation and scheduling of the processes or functions performed by the components 1302-1308.

In further related aspects, the apparatus 1300 may include a radio transceiver component 1314. A stand alone receiver and/or stand alone transmitter may be used in lieu of or in conjunction with the transceiver 1314. The apparatus 1300 may optionally include a component for storing information, such as, for example, a memory 1316. The computer readable medium or the memory component 1316 may be operatively coupled to the other components of the apparatus 1300 via the bus 1312 or the like. The memory component 1316 may be adapted to store computer readable instructions and data for effecting the processes and behavior of the components 1302-1308, and subcomponents thereof, or the processor 1310, or the methods disclosed herein. The memory component 1316 may retain instructions for executing functions associated with the components 1302-1308. While shown as being external to the memory 1316, it is to be understood that one or more of the components 1302-1308 can exist within the memory component 1316.

Figure 14:
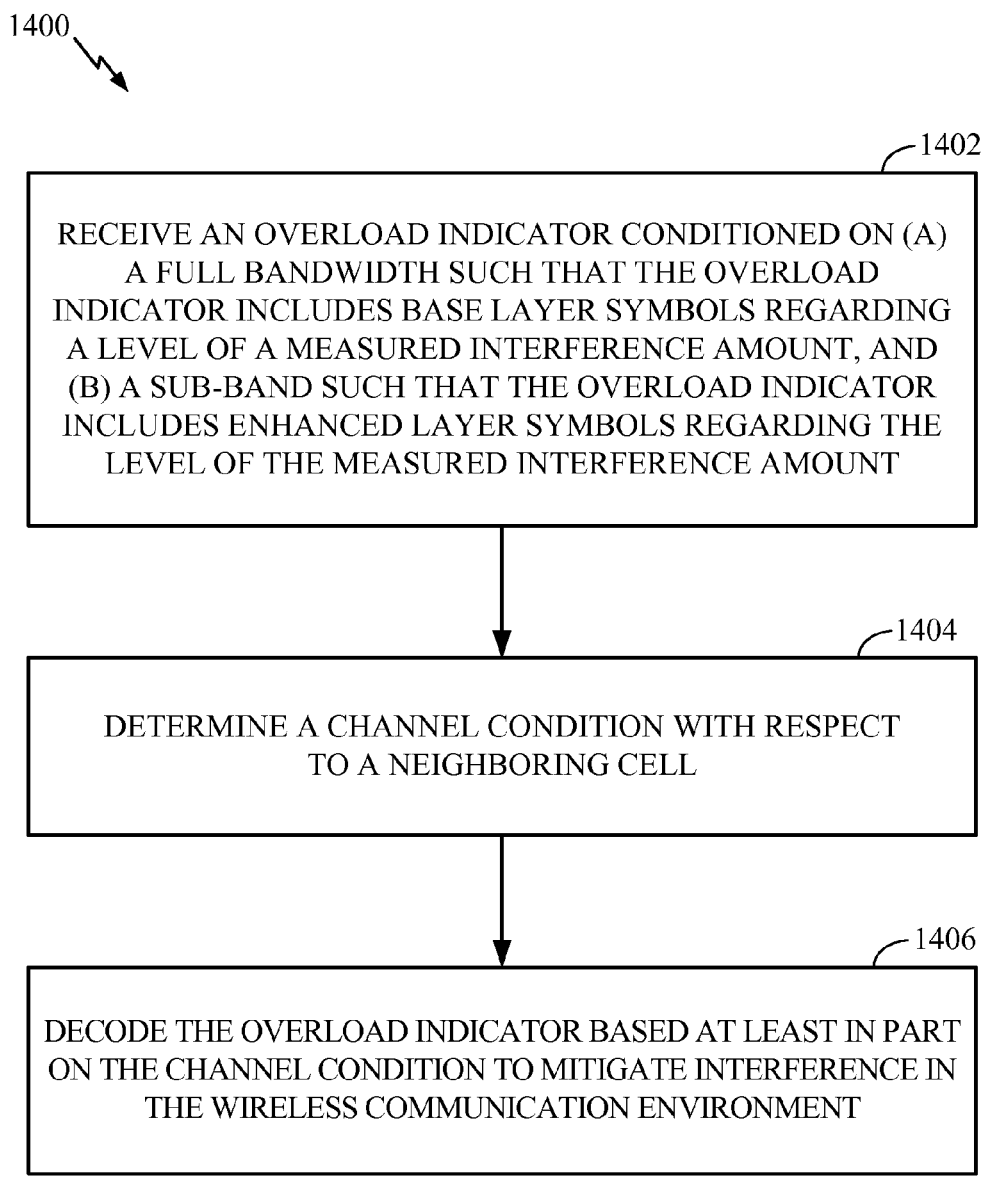

In accordance with one or more aspects of the embodiments described herein, there are provided a method for transmit power control by an AT or the like. With reference to FIG. 14, there is shown a method 1400 that involves, at 1402, receiving an overload indicator conditioned on (a) a full bandwidth such that the overload indicator includes base layer symbols regarding a level of a measured interference amount, and (b) a sub-band such that the overload indicator includes enhanced layer symbols regarding the level of the measured interference amount. At 1404, a channel condition is determined with respect to a neighboring cell. At 1406, the overload indicator is decoded based at least in part on the channel condition to mitigate interference in the wireless communication environment.

Figure 15:
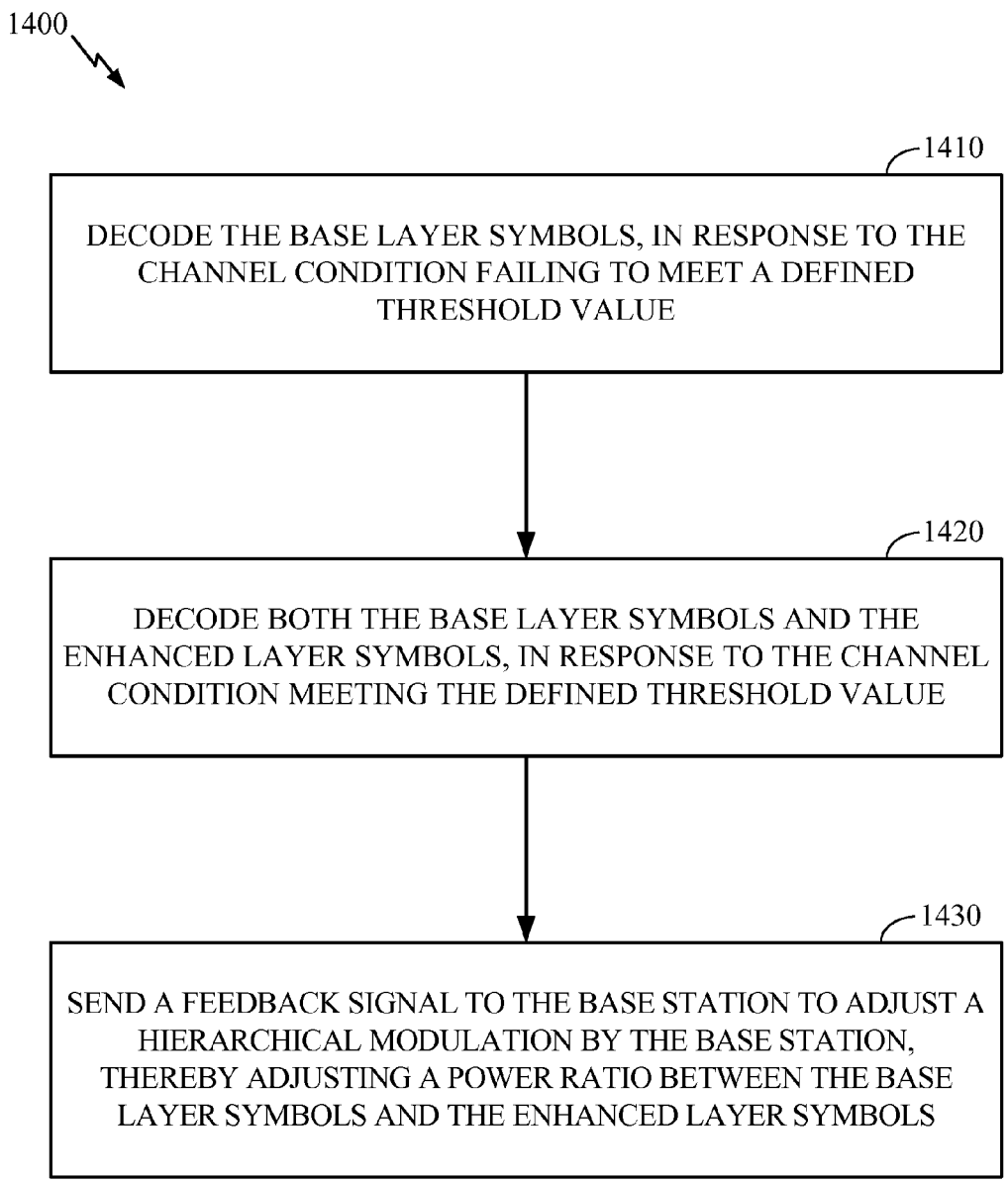
FIG. 15 illustrates further aspects of the methodology of FIG. 14.

With reference to FIG. 15, decoding the overload indicator may comprise, at 1410, decoding the base layer symbols, in response to the channel condition failing to meet a defined threshold value. Decoding the overload indicator may comprise, at 1420, decoding both the base layer symbols and the enhanced layer symbols, in response to the channel condition meeting the defined threshold value. The method 1400 may involve, at 1430, sending a feedback signal to the base station to adjust a hierarchical modulation by the base station, thereby adjusting a power ratio between the base layer symbols and the enhanced layer symbols.

Figure 16:
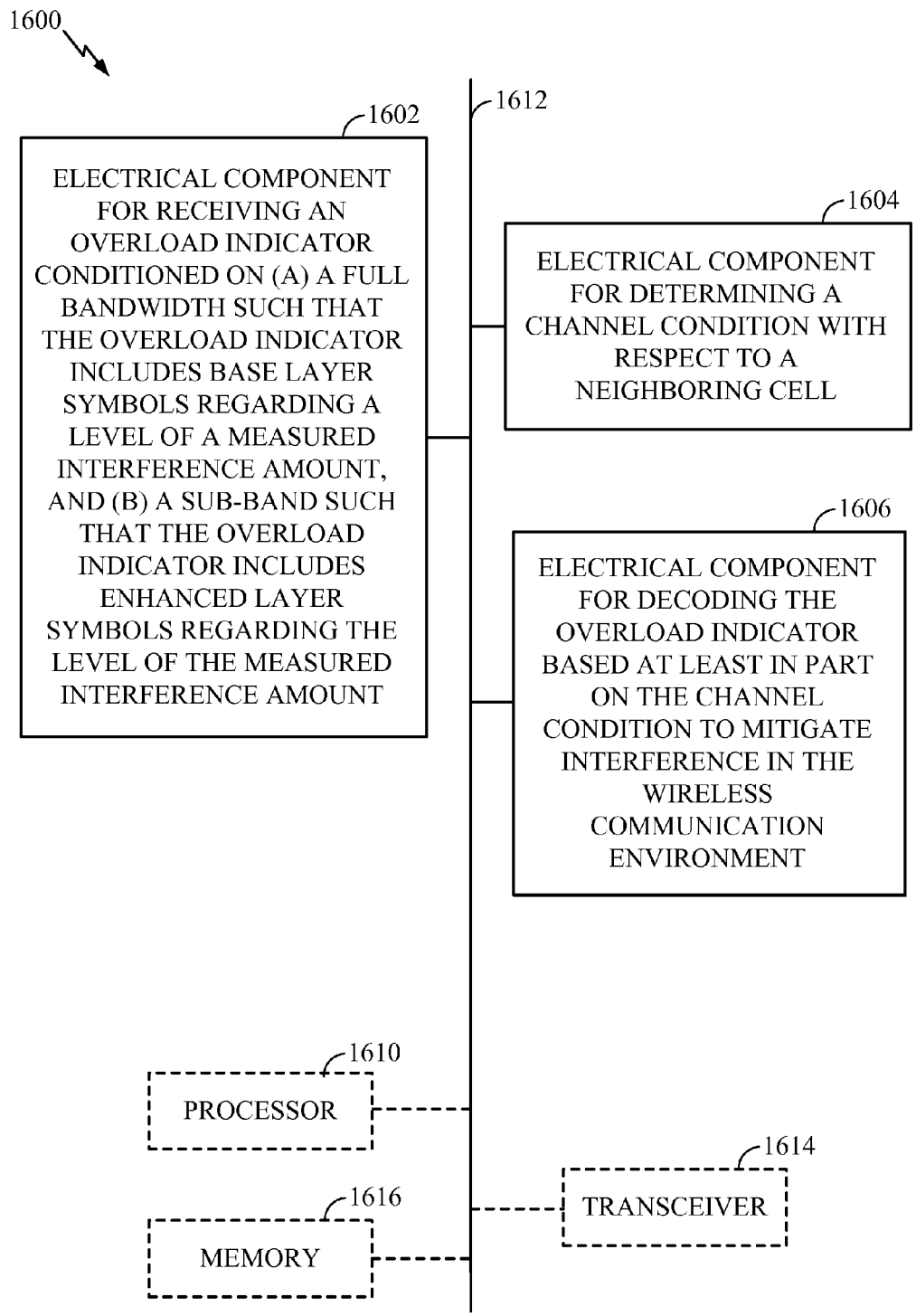
FIG. 16 shows another exemplary apparatus for transmit power control.

In accordance with one or more aspects of the embodiments described herein, there are provided apparatuses, such as mobile devices (e.g., ATs or the like), for transmit power control. With reference to FIG. 16, in one embodiment, the apparatus 1600 may comprise an electrical component or module 1602 for receiving an overload indicator conditioned on (a) a full bandwidth such that the overload indicator includes base layer symbols regarding a level of a measured interference amount, and (b) a sub-band such that the overload indicator includes enhanced layer symbols regarding the level of the measured interference amount.

The apparatus 1600 may comprise an electrical component 1604 for determining a channel condition with respect to a neighboring cell. The apparatus 1600 may comprise an electrical component 1606 for decoding the overload indicator based at least in part on the channel condition to mitigate interference in the wireless communication environment. For the sake of conciseness, the rest of the details regarding the apparatus 1600 are not further elaborated on; however, it is to be understood that the remaining features and aspects of the apparatus 1600 are substantially similar to those described above with respect to the apparatus 1300 of FIG. 13.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes Compact Disc (CD), laser disc, optical disc, Digital Versatile Disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for wireless communications, comprising:
measuring an interference amount over a sub-band and a full bandwidth;
assigning a level to the measured interference amount, the level comprising one of an overloaded level and an underloaded level;
encoding the level as an overload indicator, the overload indicator being conditioned on the sub-band such that the overload indicator includes enhanced layer symbols regarding the level of the measured interference amount and the overload indicator being further conditioned on the full bandwidth such that the overload indicator further includes base layer symbols regarding the level of the measured interference amount; and
conveying the overload indicator to at least one access terminal.

2. The method of claim 1, wherein the level comprises one of the overloaded level, the underloaded level, and a hold level.

3. The method of claim 1, wherein the base layer symbols correspond to a coarse resolution of the interference amount while the enhanced layer symbols correspond to a finer resolution of the interference amount measured over one of a same bandwidth as the base layer symbols and a subset thereof.

4. The method of claim 1, wherein encoding the level as the overload indicator comprises using a hierarchical modulation to deliver the base layer symbols and the enhanced layer symbols as a single symbol stream to the at least one access terminal.

5. The method of claim 4, wherein using the hierarchical modulation comprises
implementing scaling factors for a power ratio between the base layer symbols and the enhanced layer symbols.

6. The method of claim 5, further comprising adjusting the hierarchical modulation based at least in part on feedback from the at least one access terminal.

7. The method of claim 6, wherein adjusting the hierarchical modulation comprises modifying the power ratio to control a coverage range.

8. The method of claim 1, wherein conveying the overload indicator comprises using modulation symbols with a selected coding over one of frequency and time domain.

9. The method of claim 8, wherein the selected coding comprises one of repetition coding, Reed-Muller coding, and Tail-Biting Convolutional Code (TBCC).

10. The method of claim 1, wherein conveying the overload indicator comprises utilizing different channelizations to convey the base layer symbols and the enhanced layer symbols.

11. The method of claim 10, wherein the different channelizations comprise one of Time Division Multiplexing (TDM) and Frequency Division Multiplexing (FDM).

12. The method of claim 1, wherein conveying the overload indicator comprises utilizing different periodicities to convey the base layer symbols and the enhanced layer symbols.

13. An apparatus, comprising:
at least one radio transceiver; and
at least one processor configured to: (a) measure an interference amount over a sub-band; (b) assign a level to the measured interference amount, the level comprising one of an overloaded level and an underloaded level; (c) encode the level as an overload indicator, the overload indicator being conditioned on the sub-band such that the overload indicator includes enhanced layer symbols regarding the level of the measured interference amount; and (d) instruct the at least one radio transceiver to convey the overload indicator to at least one access terminal, wherein the at least one processor is further configured to measure an interference amount over a full bandwidth, and wherein the overload indicator is further conditioned on the full bandwidth such that the overload indicator includes base layer symbols regarding the level of the measured interference amount.

14. The apparatus of claim 13, wherein:
the base layer symbols correspond to a coarse resolution of the interference amount while the enhanced layer symbols correspond to a finer resolution of the interference amount; and
the enhanced layer symbols correspond to the finer resolution of the interference amount measured over one of a same bandwidth as the base layer symbols and a subset thereof.

15. The apparatus of claim 13, wherein the at least one processor uses a hierarchical modulation to deliver the base layer symbols and the enhanced layer symbols as a single symbol stream to the at least one access terminal.

16. The apparatus of claim 15, wherein the at least one processor adjusts the hierarchical modulation based at least in part on feedback from the at least one access terminal.

17. The apparatus of claim 16, wherein the at least one processor modifies a power ratio power ratio between the base layer symbols and the enhanced layer symbols.

18. The apparatus of claim 13, wherein the at least one processor instructs the at least one radio transceiver to utilize at least one of different channelizations and different periodicities to convey the base layer symbols and the enhanced layer symbols.

19. An apparatus, comprising:
means for measuring an interference amount over a sub-band and a full bandwidth;
means for assigning a level to the measured interference amount, the level comprising one of an overloaded level and an underloaded level;
means for encoding the level as an overload indicator, the overload indicator being conditioned on the sub-band such that the overload indicator includes enhanced layer symbols regarding the level of the measured interference amount, wherein the overload indicator is further conditioned on the full bandwidth such that the overload indicator includes base layer symbols regarding the level of the measured interference amount; and
means for conveying the overload indicator to at least one access terminal.

20. The apparatus of claim 19, wherein:
the base layer symbols correspond to a coarse resolution of the interference amount while the enhanced layer symbols correspond to a finer resolution of the interference amount; and
the enhanced layer symbols correspond to the finer resolution of the interference amount measured over one of a same bandwidth as the base layer symbols and a subset thereof.

21. The apparatus of claim 19, further comprising means for using a hierarchical modulation to deliver the base layer symbols and the enhanced layer symbols as a single symbol stream to the at least one access terminal.

22. The apparatus of claim 21, further comprising means for adjusting the hierarchical modulation based at least in part on feedback from the at least one access terminal.

23. The apparatus of claim 22, further comprising means for modifying a power ratio between the base layer symbols and the enhanced layer symbols.

24. The apparatus of claim 19, further comprising means for utilizing at least one of different channelizations and different periodicities to convey the base layer symbols and the enhanced layer symbols.

25. A computer program product, comprising:
a non-transitory computer-readable medium having code for:
measuring an interference amount over a sub-band and a full bandwidth;
assigning a level to the measured interference amount, the level comprising one of an overloaded level and an underloaded level;
encoding the level as an overload indicator, the overload indicator being conditioned on the sub-band such that the overload indicator includes enhanced layer symbols regarding the level of the measured interference amount, and wherein the overload indicator is further conditioned on the full bandwidth such that the overload indicator includes base layer symbols regarding the level of the measured interference amount; and
conveying the overload indicator to at least one access terminal.

26. The computer program product of claim 25, wherein:
the base layer symbols correspond to a coarse resolution of the interference amount while the enhanced layer symbols correspond to a finer resolution of the interference amount; and
the enhanced layer symbols correspond to the finer resolution of the interference amount measured over one of a same bandwidth as the base layer symbols and a subset thereof.

27. The computer program product of claim 25, wherein the non-transitory computer-readable medium further has code for using a hierarchical modulation to deliver the base layer symbols and the enhanced layer symbols as a single symbol stream to the at least one access terminal.

28. The computer program product of claim 27, wherein the non-transitory computer-readable medium further has code for adjusting the hierarchical modulation based at least in part on feedback from the at least one access terminal.

29. The computer program product of claim 28, wherein the non-transitory computer-readable medium further has code for modifying a power ratio between the base layer symbols and the enhanced layer symbols.

30. The computer program product of claim 25, wherein the non-transitory computer-readable medium further has code for utilizing at least one of different channelizations and different periodicities to convey the base layer symbols and the enhanced layer symbols.

31. A method for wireless communications, comprising:
receiving an overload indicator conditioned on (a) a full bandwidth such that the overload indicator includes base layer symbols regarding a level of a measured interference amount, and (b) a sub-band such that the overload indicator includes enhanced layer symbols regarding the level of the measured interference amount;
determining a channel condition with respect to a neighboring cell; and
decoding the overload indicator based at least in part on the channel condition to mitigate interference in the wireless communication environment.

32. The method of claim 31, wherein decoding the overload indicator comprises decoding the base layer symbols, in response to the channel condition failing to meet a defined threshold value.

33. The method of claim 31, wherein decoding the overload indicator comprises decoding both the base layer symbols and the enhanced layer symbols, in response to the channel condition meeting the defined threshold value.

34. The method of claim 31, wherein the overload indicator is hierarchically modulated by a base station.

35. The method of claim 34, further comprising sending a feedback signal to the base station to adjust a hierarchical modulation by the base station, thereby adjusting a power ratio between the base layer symbols and the enhanced layer symbols.

36. An apparatus, comprising:
at least one radio transceiver for receiving an overload indicator conditioned on (a) a full bandwidth such that the overload indicator includes base layer symbols regarding a level of a measured interference amount and (b) a sub-band such that the overload indicator includes enhanced layer symbols regarding the level of the measured interference amount; and
at least one processor configured to: determine a channel condition with respect to a neighboring cell; and decode the overload indicator based at least in part on the channel condition to mitigate interference in the wireless communication environment.

37. The apparatus of claim 36, wherein the at least one processor decodes the base layer symbols, in response to the channel condition failing to meet a defined threshold value.

38. The apparatus of claim 36, wherein the at least one processor decodes both the base layer symbols and the enhanced layer symbols, in response to the channel condition meeting the defined threshold value.

39. The apparatus of claim 36, wherein the overload indicator is hierarchically modulated by a base station.

40. The apparatus of claim 39, wherein the at least one processor instructs the at least one transceiver to send a feedback signal to the base station to adjust a hierarchical modulation by the base station, thereby adjusting a power ratio between the base layer symbols and the enhanced layer symbols.

41. An apparatus, comprising:
means for receiving an overload indicator conditioned on (a) a full bandwidth such that the overload indicator includes base layer symbols regarding a level of a measured interference amount and (b) a sub-band such that the overload indicator includes enhanced layer symbols regarding the level of the measured interference amount;
means for determining a channel condition with respect to a neighboring cell; and
means for decoding the overload indicator based at least in part on the channel condition to mitigate interference in the wireless communication environment.

42. The apparatus of claim 41, further comprising means for decoding the base layer symbols, in response to the channel condition failing to meet a defined threshold value.

43. The apparatus of claim 41, further comprising means for decoding both the base layer symbols and the enhanced layer symbols, in response to the channel condition meeting the defined threshold value.

44. The apparatus of claim 36, wherein the overload indicator is hierarchically modulated by a base station.

45. The apparatus of claim 44, further comprising means for sending a feedback signal to the base station to adjust a hierarchical modulation by the base station, thereby adjusting a power ratio between the base layer symbols and the enhanced layer symbols.

46. A computer program product, comprising:
a non-transitory computer-readable medium having code for:
receiving an overload indicator conditioned on (a) a full bandwidth such that the overload indicator includes base layer symbols regarding a level of a measured interference amount and (b) a sub-band such that the overload indicator includes enhanced layer symbols regarding the level of the measured interference amount;
determining a channel condition with respect to a neighboring cell; and
decoding the overload indicator based at least in part on the channel condition to mitigate interference in the wireless communication environment.

47. The computer program product of claim 46, wherein the non-transitory computer-readable medium further has code for decoding the base layer symbols, in response to the channel condition failing to meet a defined threshold value.

48. The computer program product of claim 46, wherein the non-transitory computer-readable medium further has code for decoding both the base layer symbols and the enhanced layer symbols, in response to the channel condition meeting the defined threshold value.

49. The computer program product of claim 46, wherein:
the overload indicator is hierarchically modulated by a base station; and
the non-transitory computer-readable medium further has code for sending a feedback signal to the base station to adjust a hierarchical modulation by the base station, thereby adjusting a power ratio between the base layer symbols and the enhanced layer symbols.

* * * * *